US008368579B2

(12) United States Patent

Yamamoto et al.

(10) Patent No.: US 8,368,579 B2
(45) Date of Patent: Feb. 5, 2013

(54) LEARNING REMOTE CONTROLLER, REMOTE CONTROLLER LEARNING APPARATUS, LEARNING REMOTE CONTROLLER LEARNING SYSTEM, AND PROCESSING METHODS AND PROGRAMS FOR USE THEREWITH

(75) Inventors: Toshifumi Yamamoto, Saitama (JP); Tomoko Kumagai, Chiba (JP); Masayuki Kihara, Tokyo (JP); Atsushi Naoi, Saitama (JP)

(73) Assignee: Sony Corporation, Tokyo (JP)

( * ) Notice: Subject to any disclaimer, the term of this patent is extended or adjusted under 35 U.S.C. 154(b) by 1038 days.

(21) Appl. No.: 11/935,538

(22) Filed: Nov. 6, 2007

(65) Prior Publication Data

US 2008/0180303 A1 Jul. 31, 2008

(30) Foreign Application Priority Data

Nov. 24, 2006 (JP) ................................ 2006-316414

(51) Int. Cl.
*H04L 17/02* (2006.01)
*H04N 5/232* (2006.01)
*H04N 7/14* (2006.01)
*H04N 5/44* (2011.01)

(52) U.S. Cl. .................. 341/176; 348/211.6; 348/14.05; 348/734

(58) Field of Classification Search ............... 178/4.1 R; 348/734; 341/173, 176; 345/160; 340/12.23–12.28, 340/13.21, 4.3–4.31, 4.11, 5.1
See application file for complete search history.

(56) References Cited

U.S. PATENT DOCUMENTS 5,819,294 A * 10/1998 Chambers ..................... 707/104
6,008,735 A * 12/1999 Chiloyan et al. ........... 340/12.24
6,130,625 A * 10/2000 Harvey ...................... 340/12.24
6,597,374 B1 * 7/2003 Baker et al. ................... 715/717
7,307,574 B2 * 12/2007 Kortum et al. ................ 341/176
7,429,932 B1 * 9/2008 Newell et al. .............. 340/12.24

FOREIGN PATENT DOCUMENTS

JP 10-304473 11/1998
JP 2003-87881 3/2003

OTHER PUBLICATIONS

Office Action issued Jun. 14, 2011, in Japanese Patent Application No. 2006-316414.

* cited by examiner

*Primary Examiner* — Albert Wong
*Assistant Examiner* — Jerold Murphy
(74) *Attorney, Agent, or Firm* — Oblon, Spivak, McClelland, Maier & Neustadt, L.L.P.

(57) ABSTRACT

Disclosed herein is a remote controller apparatus including: preset holding means for holding, per preset code, preset information representative of correspondence between buttons of a plurality of trial-targeted remote controllers on the one hand, and an output signal given when each of the buttons is pushed on the other hand; evaluation value creating means for counting, out of the preset information held in the preset holding means, the number of preset codes of which the output signal is the same for each of the pushed buttons, before setting the largest count as an evaluation value of the button in question; and button presenting means for presenting as a trial button the button of which the evaluation value is the smallest.

16 Claims, 11 Drawing Sheets

231 232 233

| BUTTON NAME | PRESET CODE CANDIDATE | | | | EVALUATION VALUE |
|---|---|---|---|---|---|
| | GROUP A | GROUP B | GROUP C | ••• | |
| POWER | 8001,8002, 8003 | 8050,8051, 8052 | 8081 | ••• | 3 |
| PLAY | 8001,8002, 8003,8050, 8052 | 8051 | 8081 | ••• | 5 |
| CHANNEL+ | 8001,8002 | 8003 | 8050 | ••• | 2 |
| PIP ON/OFF | 8001 | 8001 | 8002,8003, 8050,8051, 8052,8081 | ••• | 600 |
| ⋮ | ⋮ | ⋮ | ⋮ | ••• | ⋮ |

FIG. 4

211 212 213 214

| TYPE | MANUFACTURER NAME | PRESET CODE | INTRA-DATABASE ADDRESS |
|---|---|---|---|
| TV | "A" ELECTRIC CO. | 8018 | • |
| TV | "C" COMMUNICATION CO. | 8067 | • |
| DVD | "A" COMMUNICATION CO. | 8068 | • |
| ⋮ | ⋮ | ⋮ | ⋮ |

PRESET CODE = 8018

| BUTTON NAME | INFRARED RAY SIGNAL |
|---|---|
| POWER | 11000000002000000081 |
| VOLUME+ | 11000000002400000081 |
| VOLUME- | 11000000002500000081 |
| MUTING | 11000000000000000081 |
| CHANNEL+ | 11000000002200000081 |
| CHANNEL- | 11000000002300000081 |
| ⋮ | ⋮ |

215 216

PRESET CODE = 8068

| BUTTON NAME | INFRARED RAY SIGNAL |
|---|---|
| POWER | 04500000001700000081 |
| VOLUME+ | 04500000001200000081 |
| VOLUME- | 04500000001500000081 |
| MUTING | 04500000000B00000081 |
| CHANNEL+ | 04500000001900000081 |
| CHANNEL- | 04500000001800000081 |
| ⋮ | ⋮ |

PRESET CODE = 8067

| BUTTON NAME | INFRARED RAY SIGNAL |
|---|---|
| POWER | 11000000002000000081 |
| VOLUME+ | 11000000000100000081 |
| VOLUME- | 11000000000D00000081 |
| MUTING | 11000000000B00000081 |
| CHANNEL+ | 11000000002200000081 |
| CHANNEL- | 11000000002300000081 |
| ⋮ | ⋮ |

FIG. 5

221 222

| BUTTON NAME | INFRARED RAY SIGNAL | | | |
| --- | --- | --- | --- | --- |
| | PRESET CODE = 8018 | PRESET CODE = 8066 | PRESET CODE = 8069 | • • • |
| POWER | 11000000002000000081 | 11000000002000000081 | 04500000001700000081 | • • • |
| VOLUME+ | 11000000002400000081 | 11000000000100000081 | 04500000001200000081 | • • • |
| VOLUME- | 11000000002500000081 | 11000000000D00000081 | 04500000001500000081 | • • • |
| MUTING | 11000000000000000081 | 11000000000B00000081 | 04500000000B00000081 | • • • |
| CHANNEL+ | 11000000002200000081 | 11000000002200000081 | 04500000001900000081 | • • • |
| CHANNEL- | 11000000002300000081 | 11000000002300000081 | 04500000001800000081 | • • • |
| ⋮ | ⋮ | ⋮ | ⋮ | • • • |

FIG. 6

231 232 233

| BUTTON NAME | PRESET CODE CANDIDATE | | | | EVALUATION VALUE |
|---|---|---|---|---|---|
| | GROUP A | GROUP B | GROUP C | ... | |
| POWER | 8001,8002, 8003 | 8050,8051, 8052 | 8081 | ... | 3 |
| PLAY | 8001,8002, 8003,8050, 8052 | 8051 | 8081 | ... | 5 |
| CHANNEL+ | 8001,8002 | 8003 | 8050 | ... | 2 |
| PIP ON/OFF | 8001 | 8001 | 8002,8003, 8050,8051, 8052,8081 | ... | 600 |
| ... | ... | ... | ... | ... | ... |

LEARNING REMOTE CONTROLLER, REMOTE CONTROLLER LEARNING APPARATUS, LEARNING REMOTE CONTROLLER LEARNING SYSTEM, AND PROCESSING METHODS AND PROGRAMS FOR USE THEREWITH

CROSS REFERENCES TO RELATED APPLICATIONS

The present invention contains subject matter related to Japanese Patent Application JP 2006-316414 filed with the Japan Patent Office on Nov. 24, 2006, the entire contents of which being incorporated herein by reference.

BACKGROUND OF THE INVENTION

1. Field of the Invention

The present invention relates to a learning remote controller learning system. More particularly, the invention relates to a remote controller learning apparatus for presetting a learning remote controller to learn signals to be output, a learning remote controller, a remote controller learning system including a learning remote controller and a remote controller learning apparatus, processing methods for use with these pieces of equipment, and programs for causing a computer to execute these methods.

2. Description of the Related Art

In recent years, growing numbers and types of electronic apparatuses have been developed for remote control by their remote controllers typically using infrared ray signals. These remote controllers are given different functions depending on the type of the equipment they control and on the manufacturer of the equipment. It follows that each electronic apparatus needs to be furnished with a dedicated remote controller.

Against this background, learning remote controllers have been proposed such as one disclosed by Japanese Patent Laid-open No. Hei 7-240977 (FIG. 6). The learning remote controller typically acquires functions equivalent to those of another particular remote controller when preset signal patterns being output by the latter.

SUMMARY OF THE INVENTION

To preset the learning remote controller to learn signal patterns may require actually pushing buttons of the targeted remote controller so as to output the latter's signals. During the presetting process, the preset codes of the learning remote controller are determined in correspondence with the buttons of the other remote controller. With typical learning remote controllers, the buttons to be pushed on the targeted remote controller are selected experimentally. Any one button, when selected, may correspond to a plurality of preset codes. Given the difficulty of narrowing down the candidate preset codes to determine a specific preset code, it often takes time to complete the presetting process.

The present invention has been made in view of the above circumstances and provides a learning remote controller that is preset in a manner letting the button to be pushed on a targeted remote controller be suitably selected, whereby the time it takes to preset the learning remote controller is shortened.

In carrying out the present invention and according to one embodiment thereof, there is provided a remote controller learning apparatus including: preset holding means for holding, per preset code, preset information representative of correspondence between buttons of a plurality of trial-targeted remote controllers on the one hand, and an output signal given when each of the buttons is pushed on the other hand; evaluation value creating means for counting, out of the preset information held in the preset holding means, the number of preset codes of which the output signal is the same for each of the pushed buttons, before setting the largest count as an evaluation value of the button in question; and button presenting means for presenting as a trial button the button of which the evaluation value is the smallest. This embodiment is thus arranged to present the button whose evaluation value is the smallest as the optimal trial button.

Preferably, the remote controller learning apparatus according to the present embodiment may further include: signal receiving means for receiving as a trial signal the output signal given when the trial button of the trial-targeted remote controller is pushed; and preset code determining means for finalizing the preset code having the correspondence between the trial button and the trial signal, before retrieving the finalized preset code from the preset information held in the preset holding means. This preferred variation of the invention is arranged to retrieve the preset code that includes the correspondence between the trial button and the trial signal.

Preferably, if the preset code determining means failed to finalize the preset code, then the button presenting means may present as the trial button the button of which the evaluation value is the next-smallest from among the buttons included in the preset information. This preferred variation of the invention is arranged to narrow down the preset codes until one of them is finalized.

Preferably, the remote controller learning apparatus of the present embodiment may further include outputting means for retrieving from the preset holding means the preset information corresponding to the retrieved preset code, before setting the retrieved preset information to the trial-targeted remote controller. This preferred variation of the invention is arranged to set the preset information corresponding to the preset code to the trial targeted remote controller.

Preferably, the remote controller learning apparatus of the present invention may further include: second preset holding means for holding, per preset code, the preset information about the plurality of trial-targeted remote controllers in association with at least either an equipment type or an equipment manufacturer name; designation receiving means for receiving either the equipment type or the equipment manufacturer name designated; and preset retrieving means for retrieving the preset information from the second preset holding means and causing the preset holding means to hold the retrieved preset information with regard to the preset code corresponding to the designation received by the designation receiving means. This preferred variation of the invention is arranged to retrieve the preset information that matches the designated apparatus type or apparatus manufacturer.

According to another embodiment of the present invention, there is provided a remote controller learning system including a learning remote controller and a remote controller learning apparatus which causes the learning remote controller to learn signals to be output; wherein the learning remote controller includes: operation receiving means for receiving an operation to push a button; signal correspondence holding means for holding correspondence between the button of which the operation is received by the operation receiving means on the one hand, and an output signal given when the button in question is pushed on the other hand; signal converting means for retrieving the output signal corresponding to the button pushing operation from preset information held in the signal correspondence holding means; and signal outputting means for outputting the output signal retrieved by the signal converting means; wherein the remote controller learning apparatus includes: preset holding means for holding, per preset code, preset information representative of correspondence between buttons of a plurality of trial-targeted remote controllers on the one hand, and an output signal given when each of the buttons is pushed on the other hand; evaluation value creating means for counting the number of preset codes of which the output signal is the same for each of the pushed buttons on the plurality of trial-targeted remote controllers, before setting the largest count as an evaluation value of the button in question; button presenting means for presenting as a trial button the button of which the evaluation value is the smallest; signal receiving means for receiving as a trial signal the output signal given when the trial button of the trial-targeted remote controller is pushed; preset code determining means for retrieving the preset code having the correspondence between the trial button and the trial signal from the preset information held in the preset holding means; and outputting means for retrieving from the preset holding means the preset information corresponding to the retrieved preset code, before setting the retrieved preset information to the signal correspondence holding means as the correspondence with regard to the learning remote controller. This embodiment of the invention is arranged to present the button whose preset code count is the smallest as the optimal trial button, and to set the preset information corresponding to the preset code that includes the trial button and trial signal to the trial-targeted remote controller.

According to a further embodiment of the present invention, there is provided a learning remote controller including: signal receiving means for receiving as a trial signal an output signal given when a trial button of a trial-targeted remote controller is pushed; preset holding means for holding, per preset code, preset information representative of correspondence between buttons of a plurality of remote controllers including the trial-targeted remote controller on the one hand, and an output signal given when each of the buttons is pushed on the other hand; evaluation value creating means for counting the number of preset codes of which the output signal is the same for each of the pushed buttons, before setting the largest count as an evaluation value of the button in question; button presenting means for presenting as the trial button the button of which the evaluation value is the smallest; preset code determining means for retrieving the preset code having the correspondence between the trial button and the trial signal from the preset information held in the preset holding means; signal correspondence retrieving means for retrieving the preset information corresponding to the retrieved preset code from the preset holding means; signal correspondence holding means for holding the preset information retrieved by the signal correspondence retrieving means; operation receiving means for having at least one button and receiving a button pushing operation; signal converting means for retrieving the output signal corresponding to the button pushing operation from the preset information held in the signal correspondence holding means; and signal outputting means for outputting the output signal retrieved by the signal converting means. This embodiment of the invention is arranged to present the button whose preset code count is the smallest as the optimal trial button, and to send out the output signal through the use of the preset information corresponding to the preset code that includes the trial button and trial signal.

According to an even further embodiment of the present invention, there is provided a processing method for use with a remote controller learning apparatus having signal receiving means for receiving as a trial signal an output signal given when a trial button of a trial-targeted remote controller is pushed; and preset holding means for holding, per preset code, preset information representative of correspondence between buttons of a plurality of remote controllers including the trial-targeted remote controller on the one hand, and an output signal given when each of the buttons is pushed on the other hand; the processing method including the steps of: grouping the buttons of which the preset information is held in the preset holding means, into groups each constituted by the buttons for which the output signal is the same; counting the number of preset codes belonging to the group represented by each of the grouped buttons, before setting the largest count as an evaluation value of the button in question; and presenting as the trial button the button of which the evaluation value is the smallest. This embodiment of the invention is arranged to present the button whose preset code count is the smallest as the optimal trial button.

According to a still further embodiment of the present invention, there is provided a processing method for use with a learning remote controller having signal receiving means for receiving as a trial signal an output signal given when a trial button of a trial-targeted remote controller is pushed; preset holding means for holding, per preset code, preset information representative of correspondence between buttons of a plurality of remote controllers including the trial-targeted remote controller on the one hand, and an output signal given when each of the buttons is pushed on the other hand; operation receiving means for receiving an operation to push a button; and signal correspondence holding means for holding correspondence between the button of which the operation is received by the operation receiving means on the one hand, and an output signal given when the button in question is pushed on the other hand; the processing method including the steps of: grouping the buttons of which the preset information is held in the preset holding means, into groups each constituted by the buttons for which the output signal is the same; counting the number of preset codes belonging to the group represented by each of the grouped buttons, before setting the largest count as an evaluation value of the button in question; presenting as the trial button the button of which the evaluation value is the smallest; causing the signal receiving means to receive as the trial signal the output signal given when the trial button of the trial-targeted remote controller is pushed; retrieving the preset code having the correspondence between the trial button and the trial signal from the preset information held in the preset holding means; and retrieving from the preset holding means the preset information corresponding to the retrieved preset code, before causing the signal correspondence holding means to hold the extracted preset information as the correspondence. This embodiment of the invention is arranged to present the button whose preset code count is the smallest as the optimal trial button, and to set the preset information corresponding to the preset code that includes the trial button and trial signal to the learning remote controller.

According to the present embodiment outlined above, the time it takes to preset the learning remote controller is significantly reduced.

BRIEF DESCRIPTION OF THE DRAWINGS

Further objects and advantages of the present invention will become apparent upon a reading of the following description and appended drawings in which:

FIG. 4 is a schematic view showing a typical structure of a preset database as part of the embodiment;

FIG. 5 is a schematic view showing a typical structure of a preset table as part of the embodiment;

FIG. 6 is a schematic view showing a typical structure of an evaluation value table as part of the embodiment;

DETAILED DESCRIPTION OF THE PREFERRED EMBODIMENTS

Preferred embodiments of the present invention will now be described in detail with reference to the accompanying drawings.

Figure 1:
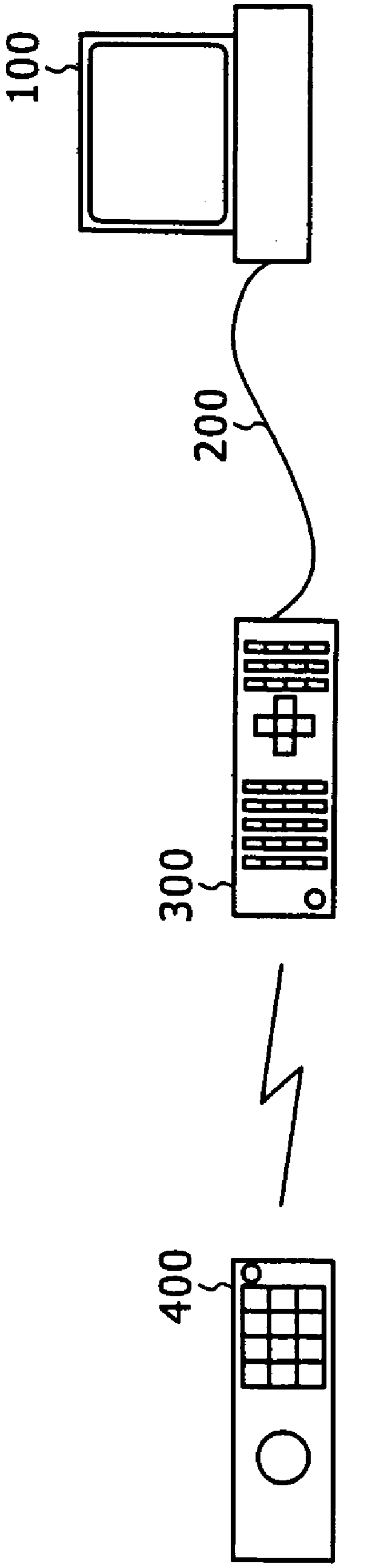
FIG. 1 is a schematic view showing a typical overall configuration of a learning remote controller learning system according to the present embodiment.

FIG. 1 is a schematic view showing a typical overall configuration of a learning remote controller learning system embodying the present invention. The learning remote controller learning system includes a personal computer 100, a learning remote controller 300, and a dedicated remote controller 400. The personal computer 100 and the learning remote controller 300 are interconnected by an interface 200.

The personal computer 100 is used to set the learning remote controller 300. Equipped with a display device such as LCD (liquid crystal display), the personal computer 100 can display operating instructions for the user to follow.

The interface 200 is provided to connect the personal computer 100 with the learning remote controller 300. Illustratively, the interface 200 may be a USB (Universal Serial Bus) arrangement. Although the configuration in FIG. 1 presupposes the use of a wired interface, a wireless interface may be adopted alternatively.

The learning remote controller 300 is capable of presetting the output signal of another remote controller (e.g., dedicated remote controller 400). As a result, the learning remote controller 30 can remotely control various types of electronic equipment.

The dedicated remote controller 400 is designed to remotely control particular electronic equipment. Usually, the dedicated remote controller 400 is sold together with the corresponding electronic equipment.

To get the learning remote controller 300 to preset the output signal of the dedicated remote controller 400 typically may require positioning a light emitting device of the dedicated remote controller 400 to face a light receiving device of the learning remote controller 300 over a short distance. Generally, that distance may be about three to eight centimeters. With the two components thus positioned, pushing a button of the dedicated remote controller 400 causes the learning remote controller 300 to receive the output signal from the dedicated remote controller 400.

Figure 2:
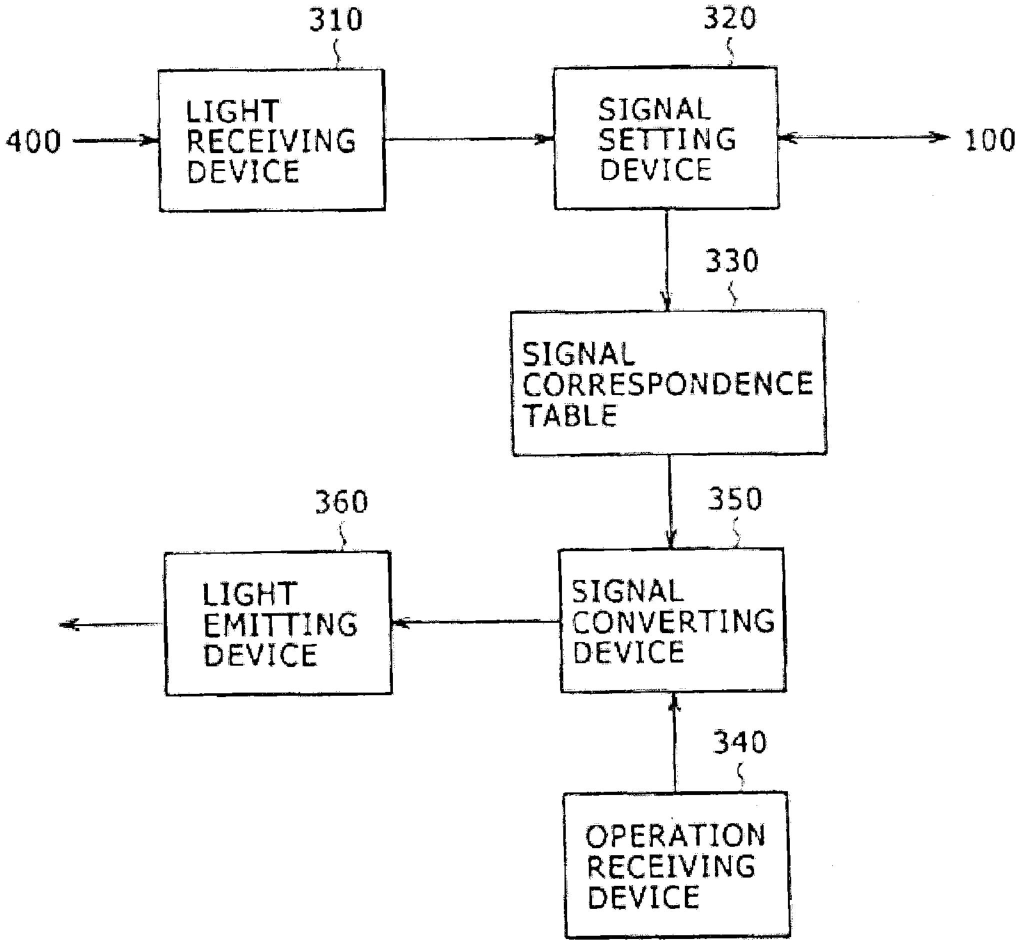
FIG. 2 is a schematic view showing a typical functional structure of a learning remote controller also according to the present embodiment.

FIG. 2 is a schematic view showing a typical functional structure of the learning remote controller 300 also embodying the present invention. The learning remote controller 300 includes a light receiving device 310, a signal setting device 320, a signal correspondence table 330, an operation receiving device 340, a signal converting device 350, and a light emitting device 360. With this embodiment, the output signal of any other remote controller is assumed to be an infrared ray signal.

The light receiving device 310 is designed to receive the output signal (infrared ray signal) of another remote controller (e.g., dedicated remote controller 400). The received infrared ray signal is converted by the light receiving device 310 into a digital signal that is fed to the signal setting device 320.

Given the digital signal from the light receiving device 310, the signal setting device 320 sends the supplied signal to the personal computer 100 via the interface 200. From the personal computer 100, the signal setting device 320 receives through the interface 200 preset information that designates correspondence between buttons and output signals. The preset information thus received is set to the signal correspondence table 330 by the signal setting device 320.

The signal correspondence table 330 holds the preset information that has been set by the signal setting device 320. When a particular button is identified on the learning remote controller 300, the signal correspondence table 330 uniquely determines the output signal of that button.

The operation receiving device 340, designed to receive an operation input effected by the user, is practiced in the form of buttons of the learning remote controller 300. When a given button is pushed, the operation receiving device 340 outputs an identification signal corresponding to the pushed button to the signal converting device 350.

Given a button identification number from the operation receiving device 340, the signal converting device 350 converts the received number into the corresponding output signal by referencing the signal correspondence table 330. Following the conversion, the output signal is sent to the light emitting device 360.

The light emitting device 360 receives the output signal from the signal converting device 350, converts the received signal into an infrared ray signal, and transmits (i.e., emits) the signal to the electronic equipment being operated.

In the manner described above, the learning remote controller 300 transmits the output signal corresponding to the pushed button on the basis of the preset information that was preset earlier to the signal correspondence table 330.

Figure 3:
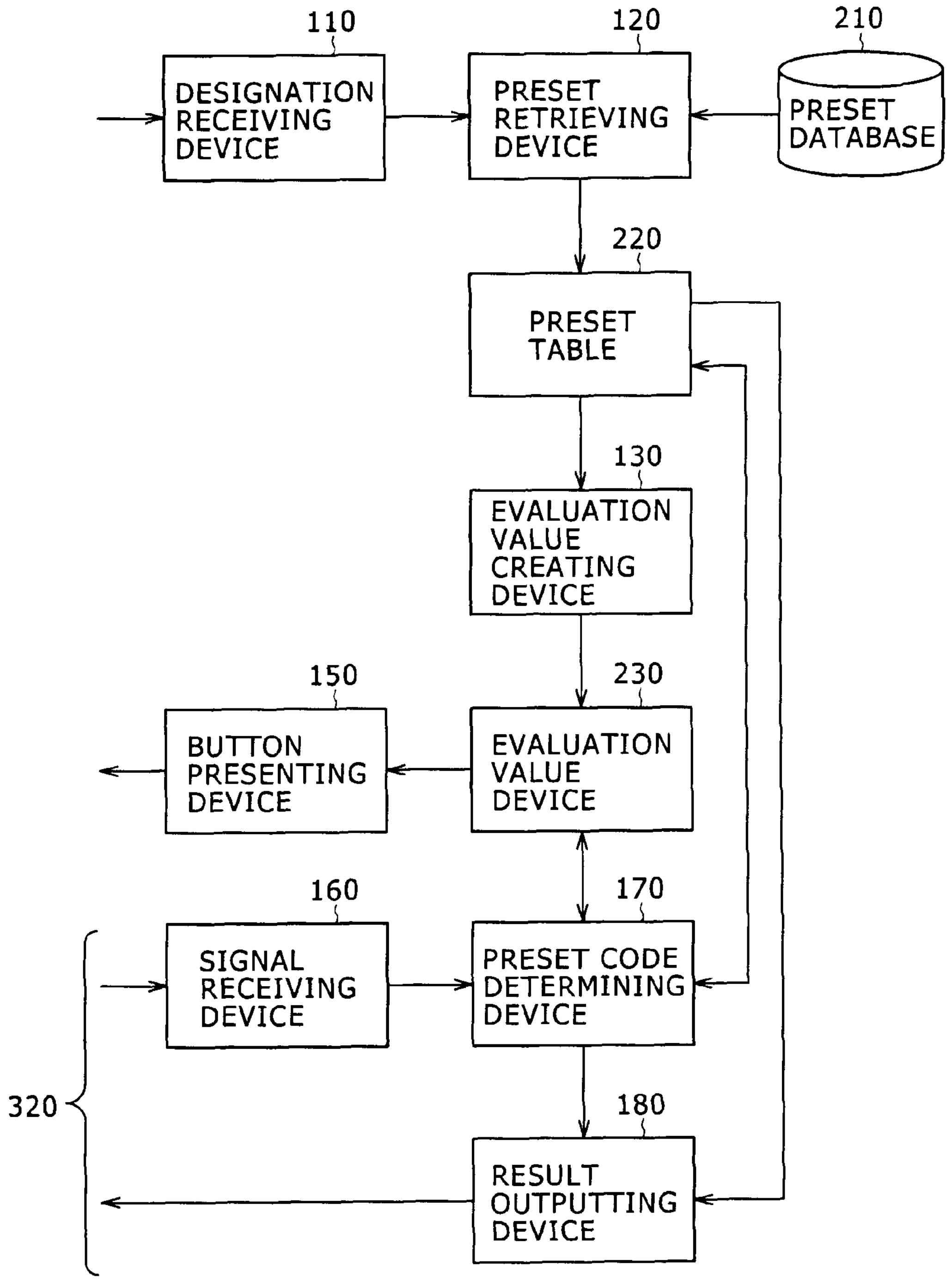
FIG. 3 is a schematic view showing a typical functional structure of a personal computer as part of the embodiment.

FIG. 3 is a schematic view showing a typical functional structure of the personal computer 100 as part of the embodiment. The personal computer 100 includes a preset database 210, a preset table 220, an evaluation value table 230, a designation receiving device 110, a preset retrieving device 120, an evaluation value creating device 130, a button presenting device 150, a signal receiving device 160, a preset code determining device 170, and a result outputting device 180.

The preset database 210 holds the preset information about electronic equipment in database form. For management purposes, the preset database 210 associates various types of electronic equipment with preset codes in such a manner that different equipment types are assigned the same preset code if they are produced by the same manufacturer. The types of electronic equipment may illustratively include the TV set, projector, terrestrial broadcast receiver, DVD (Digital Versatile Disk) home theater, set-top box, satellite broadcast receiver, DVD recorder, digital video recorder, video cassette recorder (VCR), LD (Laser Disk) player, CD (Compact Disc) player, MD (Mini Disc) deck, cassette deck, and lighting fixtures. Each manufacturer may be identified by its name; the manufacturer name is the name of the company that produced the equipment in question. Alternatively, brand names may be used in place of manufacturer names.

The preset table 220 holds the preset information corresponding to different preset codes. What is contained in the preset table 220 was retrieved earlier from the preset database 210 by the preset retrieving device 120. As such, the preset table 220 is a sub-set of the preset database 210.

The evaluation value table 230, created by the evaluation value creating device 130, holds evaluation values for each of the buttons that may be operated.

The designation receiving device 110 receives designations of the type and manufacturer name of electronic equipment. When the type and manufacturer name of a given piece of equipment are to be designated, the personal computer 100 causes its display device (not shown) to display screens that prompt the user to designate the type and the manufacturer name of interest.

The preset retrieving device 120 retrieves preset information from the preset database 210 in accordance with the designated equipment type and manufacturer name received by the designation receiving device 110. The preset information retrieved by the preset retrieving device 120 is held in the preset table 220.

The evaluation value creating device 130 creates evaluation values for each of the buttons involved on the basis of the preset information held in the preset table 220. The evaluation value creating device 130 classifies the buttons of which the corresponding output signal is the same into the same group, and counts the number of preset codes belonging to each of the groups thus formed. The maximum count is considered the evaluation value of each button. The evaluation value represents the largest number of preset codes narrowed down by pushing the corresponding button. The smaller the evaluation value, the better. The maximum count is used for evaluation on the assumption that the number of preset codes to be narrowed down is the largest. The results of the processing by the evaluation value creating device 130 are held in the evaluation value table 230.

From among the buttons held in the evaluation value table 230, the button presenting device 150 presents the button of which the evaluation value is the smallest as a trial button. The button with the smallest evaluation value is presented because the smaller the evaluation value, the smaller the number of candidate preset codes in effect when the button in question is pushed. The trial button is presented on the display device (not shown) of the personal computer 100, thereby prompting the user to push a button of the trial-targeted remote controller (e.g., dedicated remote controller 400)).

The signal receiving device 160 receives the output signal of the trial-targeted remote controller. The signal receiving device 160 is connected to the light receiving device 310 of the learning remote controller 300 via the signal setting device 320 and is ready to receive the output signal of the trial-targeted remote controller. Alternatively, the output signal of the trial-targeted remote controller may be directly received by the personal computer 100. The output signal received by the signal receiving device 160 is supplied as a trial signal to the preset code determining device 170.

Based on the trial signal coming from the signal receiving device 160, the preset code determining device 170 searches through the preset information in the preset table 220 to retrieve preset codes containing correspondence between the trial button and the trial signal. If one preset code is retrieved, that preset code is finalized as the target preset code. If there are two or more retrieved preset codes, then the other preset codes are removed from the preset table 220 and the steps above are repeated. That is, the evaluation value creating device 130 creates evaluation values based on the new content of the preset table 220, and the button presenting device 150 presents the trial button accordingly.

If no applicable preset code is retrieved by the preset code determining device 170, then the button presenting device 150 presents the button having the next-smallest evaluation value as the trial button. If a button with no preset code retrieved for it turns out to be the first trial button, then there is a possibility that the type and/or the manufacturer name of the equipment in question has been incorrectly designated. In such a case, the process of designation input is repeated.

The result outputting device 180 retrieves from the preset table 220 the preset information corresponding to the preset code finalized by the preset code determining device 170. The retrieved preset information is sent to and held by the signal correspondence table 330 by way of the signal setting device 320 in the learning remote controller 300. Alternatively, the result outputting device 180 may retrieve from the preset database 210 the preset information corresponding to the preset code.

As described above, the personal computer 100 selects and presents the trial button to be pushed on the trial-targeted remote controller. When the trial button is pushed, the personal computer 100 receives the corresponding trial signal and finalizes the preset code accordingly.

FIG. 4 is a schematic view showing a typical structure of the preset database 210 as part of the embodiment. The preset database 210 holds data representative of a type 211, a manufacturer name 212, and a preset code 213 associated with one another for each type of electronic equipment. The database structure thus allows the preset retrieving device 120 to retrieve the preset code 213 corresponding to the designation input received by the designation receiving device 110. Although the preset code 213 is assumed to be a two-byte signal for this embodiment, this is an example and not limitative of the present invention.

Furthermore, the preset database 210 holds the preset information corresponding to each preset code 213. The address of the corresponding preset information is held at an intra-database address 214 in association with the preset code 213.

The preset information corresponding to each preset code 213 is held in association with a button name 215 and an infrared ray signal 216 being linked to each other. The button names 215 are the names assigned to buttons and need to be consistent throughout the preset database 210. As long as they are consistent, the button names 215 may be abbreviations or the like. In this example, “POWER” stands for a power button, “VOLUME+” for a volume-up button, “VOLUME−” for a volume-down button, “MUTING” for a mute button, “CHANNEL+” for a channel-up button, and “CHANNEL−” for a channel-down button.

The infrared ray signal 216 represents the content of the signal to be output when the corresponding button (having the button name 215) is pushed. Although the infrared ray signal 216 is assumed to be a 10-byte signal for this embodiment, this is an example and not limitative of the present invention.

FIG. 5 is a schematic view showing a typical structure of the preset table 220 as part of the embodiment. The preset table 220 holds a button name 221 and an infrared ray signal 222 as preset information in association with each preset code.

What is contained in the preset table 220 was retrieved earlier from the preset database 210 by the preset retrieving device 120 in keeping with the designation input. As such, the preset table 220 is a sub-set of the preset database 210.

Because the type and manufacturer name of the equipment in question are designated by the designation input, the preset table 220 does not contain information indicative of equipment types or equipment manufacturer names.

FIG. 6 is a schematic view showing a typical structure of the evaluation value table 230 as part of the embodiment. The evaluation value table 230 holds data representative of button names 231, preset code candidates 232, and evaluation values 233.

The button names 231 are the names assigned to buttons and are the same as the button names 215 mentioned above. In this example, "POWER" stands for a power button, "PLAY" for a playing button, "CHANNEL+" for a channel-up button, and "PIP ON/OFF" for a picture-in-picture on/off button.

Of the preset code candidates 232, those preset codes of which the output signal is the same for the corresponding button name 231 are classified into the same group. For example, preset codes "8001," "8002" and "8003" are shown having the same output signal with regard to the "POWER" button. The grouping of preset codes is carried out by the evaluation value creating device 130 referencing the preset table 220 and retrieving therefrom the preset codes of which the output signal (infrared ray signal 222) is the same with respect to each of the buttons involved (button name 221).

The evaluation value 233 indicates the largest number of preset codes that may be contained in any one of the groups regarding the corresponding button name 231. The evaluation value 233 represents the largest number of preset codes to be narrowed down by pushing the button having the corresponding button name 231. The largest count is adopted in order to prepare for the worst case of evaluation. Illustratively, the evaluation value is three for the "POWER" button because group A contains a maximum of three preset codes. That means the preset codes are narrowed down to three at the worst when the "POWER" button is pushed. The evaluation value is calculated for each of the buttons involved (button names 231) by the evaluation value creating device 130 referencing the evaluation value table 230 and counting the number of preset codes belonging to each of the groups formed (preset code candidates 232) for the button in question.

Some remote controllers may have a button that does not correspond to any of the button names 231. In that case, the output signal for that button is left undefined. Thus arrangements should be made to make it difficult for the button in question to be presented as the trial button. Specifically, with regard to an undefined button, one preset code may be weighted by a large value (e.g., 100). For example, group C with six undefined preset codes for the "PIP ON/OFF" (picture-in-picture on/off) button has each of its codes weighted by "100," so that an evaluation value of "600" is calculated with respect to the six preset codes.

Described below in reference to the relevant accompanying drawings is how the learning remote controller learning system of the embodiment operates.

Figure 7:
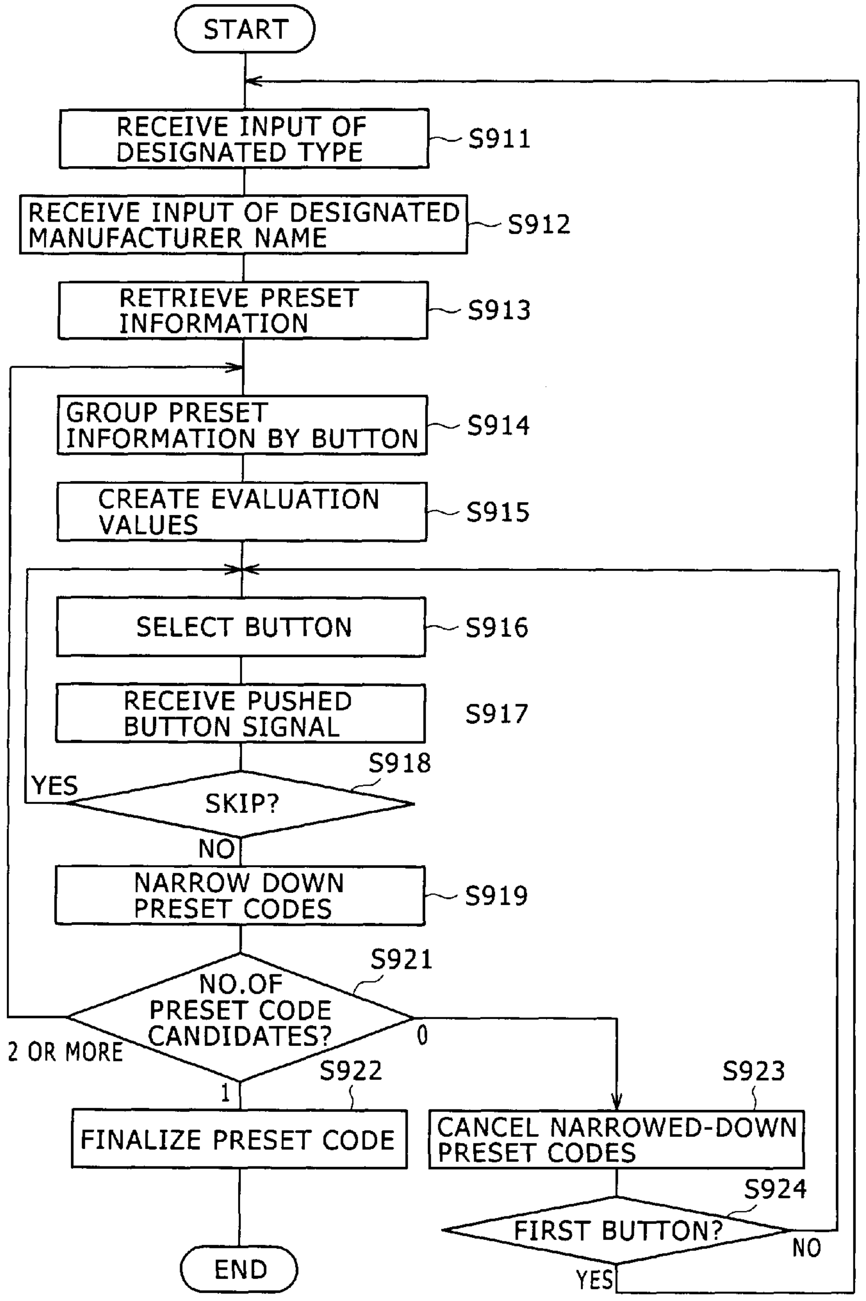
FIG. 7 is a flowchart of steps constituting a typical procedure carried out by the learning remote controller learning system according to the present embodiment.

FIG. 7 is a flowchart of steps constituting a typical procedure carried out by the learning remote controller learning system embodying the present invention.

Figure 8:
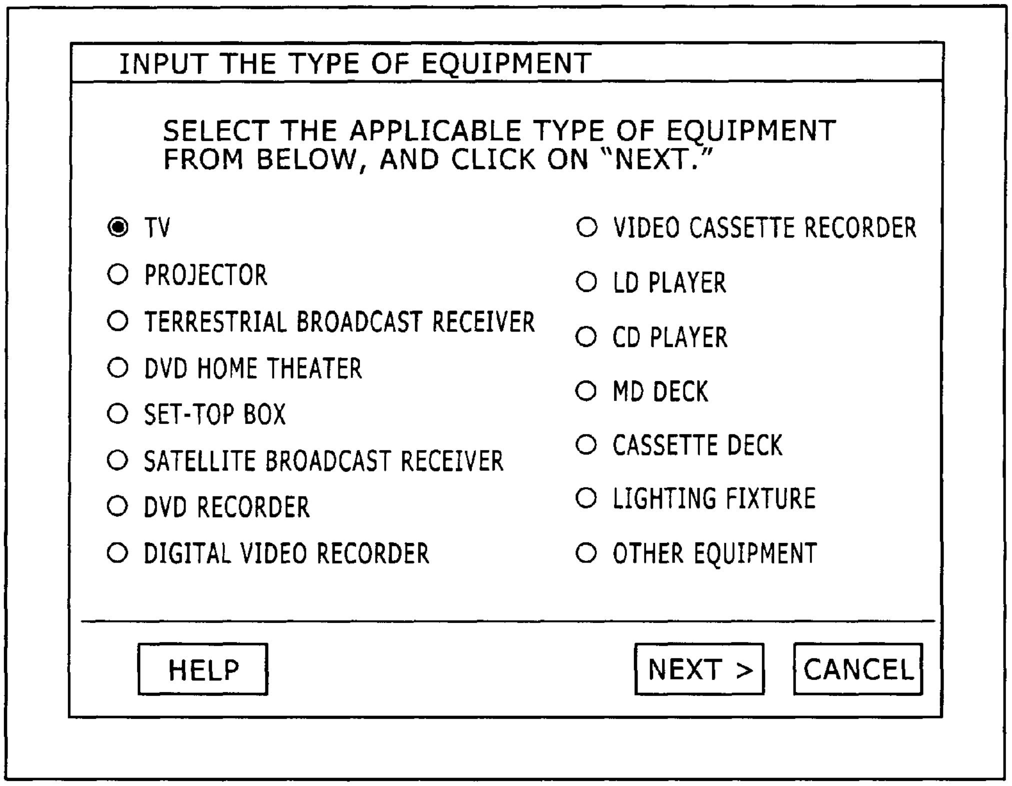
FIG. 8 is a schematic view showing a typical equipment type input screen used by the embodiment.
Figure 9:
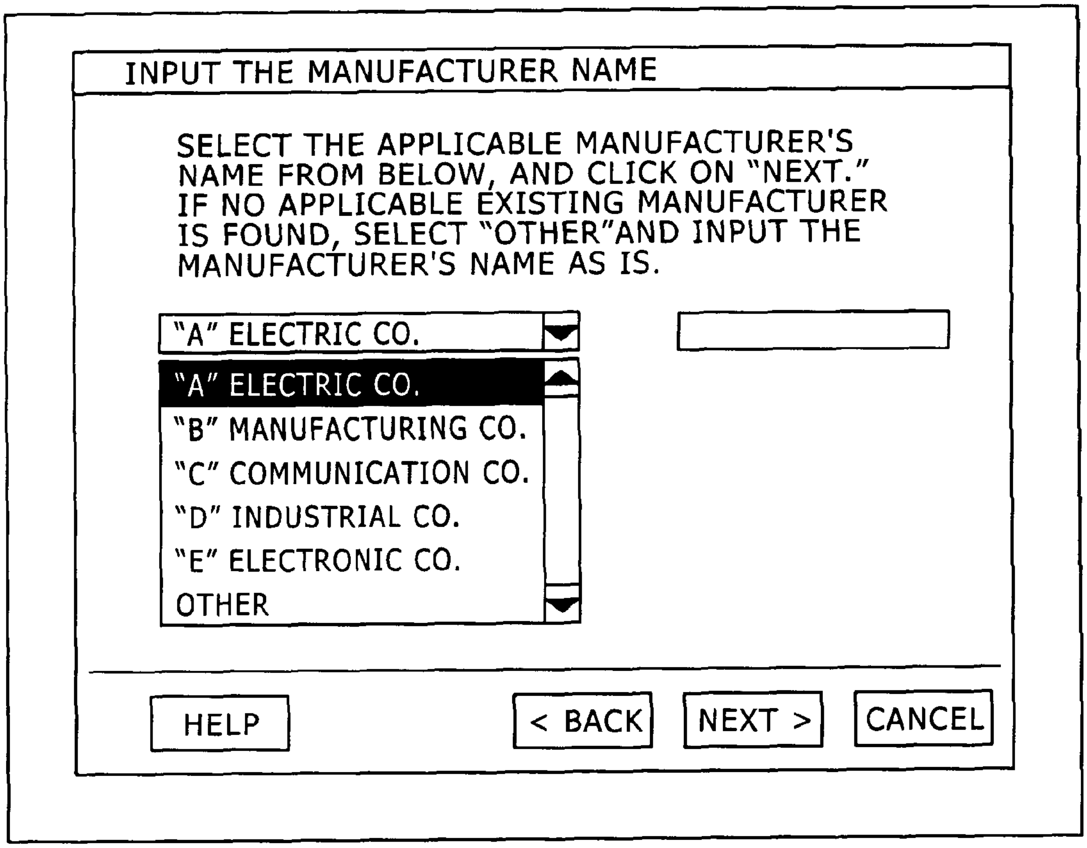
FIG. 9 is a schematic view showing a typical equipment manufacturer name input screen used by the embodiment.

In steps S911 and S912, the designation receiving device 110 receives the input of the designated type and manufacturer name of the electronic equipment in question prior to presetting of the learning remote controller 300. FIG. 8 is a schematic view showing a typical equipment type input screen used by the embodiment, and FIG. 9 is a schematic view showing a typical equipment manufacturer name input screen used by the embodiment. The equipment type input screen prompts the user to input the type of the electronic equipment of interest. On the manufacturer name input screen, the user is prompted to input the name of the manufacturer that produced the electronic equipment or the brand name under which the equipment in question is being marketed.

After the designated type and manufacturer name have been input, step S913 is reached. In step S913, the preset retrieving device 120 retrieves the applicable preset information from the preset database 210 and places the retrieved information into the preset table 220.

In step S914, based on the preset information held in the preset table 220, the evaluation value creating device 130 classifies into the same group the preset codes of which the output signal is the same for each of the buttons involved. In step S915, the evaluation value creating device 130 counts the number of preset codes belonging to each of the groups formed, and sets the maximum preset code count as the evaluation value for each button. The evaluations values thus acquired are stored into the evaluation value table 230.

Figure 10:
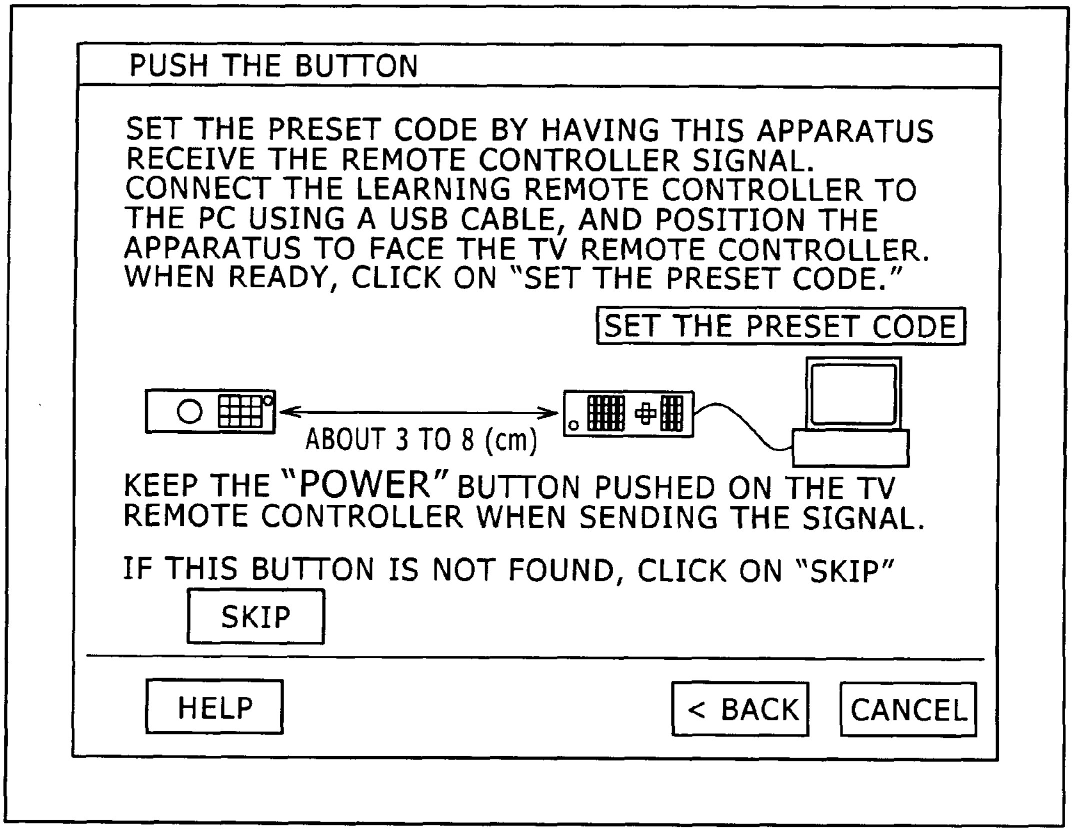
FIG. 10 is a schematic view showing a typical button presentation screen used by the embodiment.

In step S916, from among the buttons held in the evaluation value table 230, the button presenting device 150 selects the button having the smallest evaluation value and presents the selected button as a trial button. FIG. 10 is a schematic view showing a typical button presentation screen used by the embodiment. On this screen given as an example, the user is prompted to push the "POWER" button of the trial-targeted remote controller.

When the trial button thus presented is pushed on the trial-targeted remote controller, step S917 is reached. In step S917, the signal receiving device 160 receives the output signal of the pushed button.

If no corresponding button is found or if the presented trial button is not pushed for some reason in step S918, then the next trial button is sought in step S916. In step S916, the button presenting device 150 selects the button having the next-smallest evaluation value and presents the selected button as the trial button.

When the output signal of the pushed button is received by the signal receiving device 160 as the trial signal, the preset code determining device 170 in step S919 searches through the preset information in the preset table 220 based on the trial signal in order to narrow down the preset codes that have the correspondence between the trial button and the trial signal. If one preset code is found in step S921, then that preset code is finalized as the target preset code in step S922. This allows the result outputting device 180 to set the preset information applicable to the preset code to the signal correspondence table 330 by way of the signal setting device 320.

If two or more preset codes are retrieved, then the other preset codes are removed from the preset table 220 and step S914 is reached again. Based on the preset information still remaining in the preset table 220, the preset codes of which the output signal is the same are again classified into the same group for each of the buttons involved. The subsequent steps are then repeated. The evaluation value for each of the buttons is again calculated based on the remaining preset code candidates alone, whereby the optimum button is dynamically determined.

If the preset code determining device 170 fails to retrieve any applicable preset code in step S921, then the result of the narrowing-down operation is canceled in step S923. Step S916 is then reached again and the button presenting device 150 presents the button having the next-smallest evaluation value as the trial button. If the button for which no preset code was retrieved turns out to be the first trial button in step S924, then there is a possibility that the type and/or the manufacturer name of the equipment in question has been incorrectly designated. If that is the case, the process of designation input is repeated starting from step S911. In this case, the type and the manufacturer name can be narrowed down from the candidates derived from the initially entered data about the first trial button.

Where the embodiment of the present invention is implemented as described above, the evaluation value creating device 130 creates the evaluation value for each of the buttons involved on the basis of the preset information held in the preset table 220. The button presenting device 150 then presents trial buttons according to the evaluation values. When the trial button is pushed on the trial-targeted remote controller, the trial signal corresponding to the pushed button is received by the signal receiving device 160. Given the trial signal, the preset code determining device 170 determines the applicable preset code by referencing the preset information held in the preset table 220. This allows the signal setting device 320 to set the relevant preset information to the signal correspondence table 330.

Each evaluation value created by the evaluation value creating device 130 represents the largest number of preset codes to be narrowed down by pushing the corresponding button. That means the preset codes are narrowed down, at the worst, to the number indicated by the evaluation value. Of the buttons held in the evaluation value table 230, the one with the smallest evaluation value is selected and presented by the button presenting device 150. When the preset codes are narrowed down in this manner, it is possible to determine the target preset code in the shortest possible time. This helps reduce significantly the time it takes to preset the learning remote controller.

Figure 11:
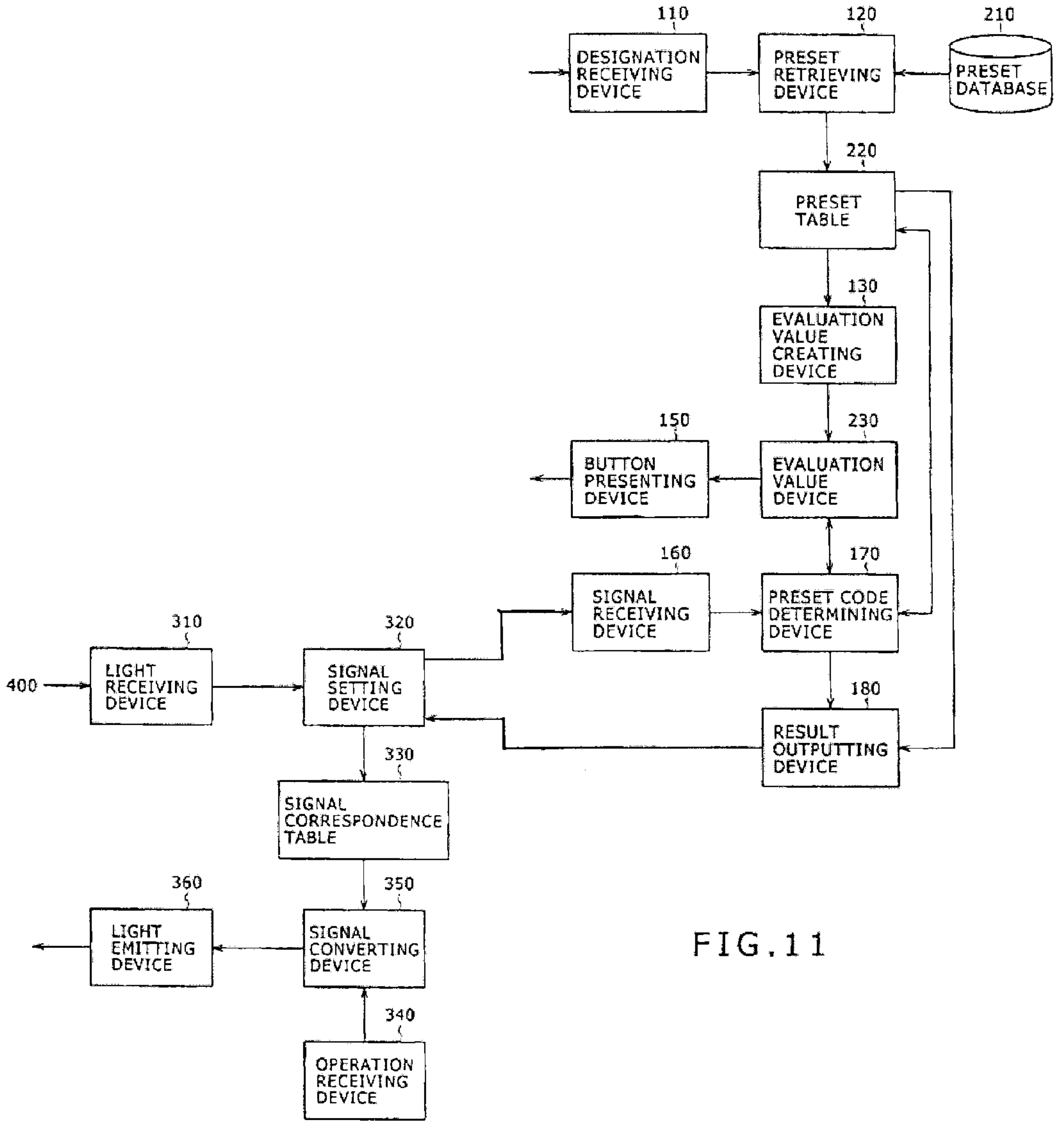
FIG. 11 is a schematic view showing a typical functional structure of a learning remote controller.

In the foregoing description, the learning remote controller 300 was shown to be preset as it is connected with the personal computer 100 through the interface 200. However, this setup is not limitative of the present invention. Alternatively, part of the functions shown in FIG. 3 may be implemented by the learning remote controller 300. As another alternative, all functions indicated in FIG. 3 may be practiced by the learning remote controller 300 which in turn may be preset alone as illustrated, for example, in FIG. 11. In this case, the learning remote controller 300 may need to be furnished with a suitable user interface through which to present trial buttons or to input equipment types and other settings.

What has been described above as preferred embodiments of the present invention with reference to the accompanying drawings corresponds to the appended claims as follows: the description of the preferred embodiments basically provides specific examples supporting what is claimed. If any example of the invention described above as a preferred embodiment does not have an exactly corresponding claim, this does not means that the example in question has no relevance to the claims. Conversely, if any example of the invention depicted above has a specifically corresponding claim, this does not mean that the example in question is limited to that claim or has no relevance to other claims.

Illustratively, the preset table 220 described above may be claimed as a preset holding section, the evaluation value creating device 130 as an evaluation value creating section, and the button presenting device 150 as a button presenting section.

In like manner, the dedicated remote controller 400 may be claimed illustratively as a trial-targeted remote controller, the signal receiving device 160 as a signal receiving section, and the present code determining device 170 as a preset code determining section.

The learning remote controller 300 may be claimed illustratively as a trial-targeted remote controller, and the result outputting device 180 as an outputting section.

The preset database 210 may be claimed illustratively as a second preset holding section, the designation receiving device 110 as a designation receiving section, and the preset retrieving device 120 as a preset retrieving section.

Likewise, the operation receiving device 340 may be claimed illustratively as an operation receiving section, the signal correspondence table 330 as a signal correspondence holding section, the signal converting device 350 as a signal converting section, the light emitting device 360 as a signal outputting section, and the preset table 220 as a preset holding section.

Furthermore, step S914 may be claimed illustratively as a grouping step, step S915 as an evaluation value creating step, step S916 as a button presenting step, step S917 as a signal receiving step, step S919 as a preset code determining step, and step S922 as a signal correspondence holding step.

The series of steps and processes discussed above as part of the embodiment may be construed as methods for carrying out such steps and processes, as programs for causing a computer to execute such methods, or as a recording medium that stores such programs.

It should be understood by those skilled in the art that various modifications, combinations, sub-combinations and alterations may occur depending on design requirements and other factor in so far as they are within the scope of the appended claims or the equivalents thereof.

What is claimed is:

1. A remote controller apparatus comprising:

a preset holder configured to hold, for each of a plurality of preset codes of a plurality of remote controllers, preset information representative of correspondences between buttons of a respective one of the plurality of remote controllers, and output signals given when said buttons are pushed;

an evaluation value creator configured to count, out of said preset information held in said preset holder, a largest number of preset codes of which said output signal is the same for each of the buttons shared between the plurality of remote controllers, before setting the largest count of the respective shared button as an evaluation value of the respective shared button;

an evaluation value table holder configured to store the evaluation values for each of the buttons shared between the plurality of remote controllers; and a button presenter configured to present as a trial button to be pressed on a trial-targeted remote controller, when the evaluation value table holder stores at least two different evaluation values, the shared button of which said evaluation value is the smallest based on the evaluation values stored in the evaluation value table holder.

2. The remote controller apparatus according to claim 1, further comprising:

a signal receiver configured to receive as a trial signal the output signal given when said trial button of the trial-targeted remote controller is pushed; and a preset code determiner configured to finalize the preset code having the correspondence between said trial button and said trial signal, before retrieving the finalized preset code from said preset information held in said preset holder.

3. The remote controller apparatus according to claim 2, wherein, when said preset code determiner fails to finalize the preset code, then said button presenter presents as said trial button the shared button of which said evaluation value is the next-smallest from among the shared buttons included in said preset information.

4. The remote controller apparatus according to claim 2, further comprising an outputter configured to retrieve from said preset holder the preset information corresponding to the retrieved preset code, before setting the retrieved preset information to a learning remote controller.

5. The remote controller apparatus according to claim 1, further comprising:

a second preset holder configured to store said preset information about said plurality of remote controllers in association with at least either an equipment type or an equipment manufacturer name;

a designation receiver configured to receive a designation of either said equipment type or said equipment manufacturer name; and a preset retriever configured to retrieve said preset information from said second preset holder and to cause said preset holder to hold the retrieved preset information with regard to any preset codes corresponding to the designation received by said receiver.

6. The remote controller apparatus according to claim 1, wherein each button of the trial-targeted remote controller identified by the button presenter is determined based on evaluation values stored in the evaluation value table holder.

7. The remote controller apparatus according to claim 1, wherein the button presenter is configured to present as said trial button to be pressed on the trial-targeted remote controller the shared button of which said evaluation value is the smallest and irrespective of the number of different output signals corresponding to the plurality of preset codes of said trial button.

8. A processing method for use with a remote controller apparatus having a signal receiver configured to receive as a trial signal an output signal given when a trial button of a trial-targeted remote controller is pushed; and a preset holder configured to hold, per preset code, preset information representative of correspondence between buttons of a plurality of remote controllers including said trial-targeted remote controller on the one hand, and an output signal given when each of said buttons is pushed on the other hand; said processing method comprising the steps of:

grouping said buttons of which the preset information is held in said preset holder, into groups each constituted by the buttons for which said output signal is the same;

counting the number of preset codes belonging to the group represented by each of the grouped buttons, before setting the largest count as an evaluation value of the button in question;

storing in an evaluation value table holder the evaluation values for each of the buttons shared between the plurality of remote controllers; and presenting as said trial button, when the evaluation value table holder stores at least two different evaluation values, the button of which said evaluation value is the smallest based on the evaluation values stored in the evaluation value table holder.

9. A processing method for use with a remote controller having a signal receiver configured to receive as a trial signal an output signal given when a trial button of a trial-targeted remote controller is pushed; a preset holder configured to hold, per preset code, preset information representative of correspondence between buttons of a plurality of remote controllers including said trial-targeted remote controller on the one hand, and an output signal given when each of said buttons is pushed on the other hand; an operation receiver configured to receive an operation to push a button; and a signal correspondence holder configured to hold correspondence between the button of which the operation is received by said operation receiver on the one hand, and an output signal given when the button in question is pushed on the other hand; said processing method comprising the steps of:

grouping said buttons of which the preset information is held in said preset holder, into groups each constituted by the buttons for which said output signal is the same;

counting the number of preset codes belonging to the group represented by each of the grouped buttons, before setting the largest count as an evaluation value of the button in question;

storing in a evaluation value table holder the evaluation values for each of the buttons shared between the plurality of remote controllers;

presenting as said trial button, when the evaluation value table holder stores at least two different evaluation values, the button of which said evaluation value is the smallest based on the evaluation values stored in the evaluation value table holder;

causing said signal receiver to receive as said trial signal the output signal given when said trial button of said trial-targeted remote controller is pushed;

retrieving the preset code having the correspondence between said trial button and said trial signal from said preset information held in said preset holder; and retrieving from said preset holder the preset information corresponding to the retrieved preset code, before causing said signal correspondence holder to hold the extracted preset information as said correspondence.

10. A non-transitory computer-readable storage medium storing a program, which when executed by a computer causes the computer to carry out a processing method for use with a remote controller apparatus having a signal receiver configured to receive as a trial signal an output signal given when a trial button of a trial-targeted remote controller is pushed; and a preset holder configured to hold, per preset code, preset information representative of correspondence between buttons of a plurality of remote controllers including said trial-targeted remote controller on the one hand, and an output signal given when each of said buttons is pushed on the other hand; said processing method comprising the steps of:

grouping said buttons of which the preset information is held in said preset holder, into groups each constituted by the buttons for which said output signal is the same;

counting the number of preset codes belonging to the group represented by each of the grouped buttons, before setting the largest count as an evaluation value of the button in question;

storing in a evaluation value table holder the evaluation values for each of the buttons shared between the plurality of remote controllers; and presenting as said trial button, when the evaluation value table holder stores at least two different evaluation values, the button of which said evaluation value is the smallest based on the evaluation values stored in the evaluation value table holder.

11. A non-transitory computer-readable storage medium storing a program, which when executed by a computer causes the computer to carry out a processing method for use with a remote controller having a signal receiver configured to receive as a trial signal an output signal given when a trial button of a trial-targeted remote controller is pushed; a preset holder configured to hold, per preset code, preset information representative of correspondence between buttons of a plurality of remote controllers including said trial-targeted remote controller on the one hand, and an output signal given when each of said buttons is pushed on the other hand; an operation receiver configured to receive an operation to push a button; and a signal correspondence holder configured to hold correspondence between the button of which the operation is received by said operation receiver, and an output signal given when the button in question is pushed; said processing method comprising the steps of:

grouping said buttons of which the preset information is held in said preset holder, into groups each constituted by the buttons for which said output signal is the same;

counting the number of preset codes belonging to the group represented by each of the grouped buttons, before setting the largest count as an evaluation value of the button in question;

storing in a evaluation value table holder the evaluation values for each of the buttons shared between the plurality of remote controllers;

presenting as said trial button, when the evaluation value table holder stores at least two different evaluation values, the button of which said evaluation value is the smallest based on the evaluation values stored in the evaluation value table holder;

causing said signal receiver to receive as said trial signal the output signal given when said trial button of said trial-targeted remote controller is pushed;

retrieving the preset code having the correspondence between said trial button and said trial signal from said preset information held in said preset holder; and retrieving from said preset holder the preset information corresponding to the retrieved preset code, before causing said signal correspondence holder to hold the extracted preset information as said correspondence.

12. A remote controller apparatus comprising:

preset holding means for holding, for each of a plurality of preset codes of a plurality of remote controllers, preset information representative of correspondences between buttons of a respective one of the plurality of remote controllers, and output signals given when said buttons are pushed;

evaluation value creating means for counting, out of said preset information held in said preset holding means, a largest number of preset codes of which said output signal is the same for each of the buttons shared between the plurality of remote controllers, before setting the largest count of the respective shared button as an evaluation value of the respective shared button;

evaluation value table storing means for storing the evaluation values for each of the buttons shared between the plurality of remote controllers; and button presenting means for presenting as a trial button to be pressed on a trial-targeted remote controller, when the evaluation value table storing means stores at least two different evaluation values, the shared button of which said evaluation value is the smallest based on the evaluation values stored in the evaluation value table storing means.

13. A remote controller comprising:

a signal receiver configured to receive as a trial signal an output signal given when a trial button of a trial-targeted remote controller is pushed;

a preset holder configured to hold, for each of a plurality of preset codes of a plurality of remote controllers, preset information representative of correspondences between buttons of a respective one of the plurality of remote controllers including said trial-targeted remote controller, and output signals given when said buttons are pushed;

an evaluation value creator configured to count a largest number of preset codes of which said output signal is the same for each of the buttons shared between the plurality of remote controllers, before setting the largest count of the respective shared button as an evaluation value of the respective shared button;

an evaluation value table holder configured to store the evaluation values for each of the buttons shared between the plurality of remote controllers;

a button presenter configured to present as said trial button to be pressed on the trial-targeted remote controller, when the evaluation value table holder stores at least two different evaluation values, the shared button of which said evaluation value is the smallest based on the evaluation values stored in the evaluation value table holder;

a preset code determiner configured to retrieve the preset code having the correspondence between said trial button and said trial signal from said preset information held in said preset holder;

a signal correspondence retriever configured to retrieve said preset information corresponding to the retrieved preset code from said preset holder;

a signal correspondence holder configured to hold said preset information retrieved by said signal correspondence retriever;

an operation receiver having at least one button and configured to receive a button pushing operation;

a signal converter configured to retrieve the output signal corresponding to said button pushing operation from said preset information held in said signal correspondence holder; and a signal outputter configured to output said output signal retrieved by said signal converter.

14. The remote controller apparatus according to claim 1, wherein the evaluation value creator creates a plurality of evaluation values for the buttons shared between the plurality of remote controllers, each of the plurality of evaluation values being associated with a different one of the buttons shared between the plurality of remote controllers; and the button presenter selects and presents as the trial button to be pressed on the trial-targeted remote controller the one of the plurality of shared buttons associated with the smallest evaluation value of the plurality of evaluation values.

15. A remote controller system comprising a remote controller and a remote controller apparatus which causes said remote controller to learn signals to be output;

wherein said remote controller includes:

operation receiving means for receiving an operation to push a button;

a signal correspondence holder configured to hold correspondence between the button of which the operation is received by the operation receiver, and an output signal given when the button is pushed;

a signal converter configured to retrieve the output signal corresponding to the button pushing operation from preset information held in said signal correspondence holder; and signal outputting means for outputting said output signal retrieved by said signal converter;

wherein said remote controller apparatus includes:

preset holding means for holding, for each of a plurality of preset codes of a plurality of remote controllers, preset information representative of correspondences between buttons of a respective one of the plurality of remote controllers, and output signals given when said buttons are pushed;

evaluation value creating means for counting a largest number of preset codes of which said output signal is the same for each of the buttons shared between said plurality of remote controllers, before setting the largest count of the respective shared button as an evaluation value of the respective shared button;

evaluation value table storing means for storing the evaluation values for each of the buttons shared between the plurality of remote controllers;

button presenting means for presenting as a trial button to be pressed on a trial-targeted remote controller, when the evaluation value table storing means stores at least two different evaluation values, the shared button of which said evaluation value is the smallest based on the evaluation values stored in the evaluation value table storing means;

signal receiving means for receiving as a trial signal the output signal given when said trial button of the trial-targeted remote controller is pushed;

preset code determining means for retrieving the preset code having the correspondence between said trial button and said trial signal from said preset information held in said preset holding means; and outputting means for retrieving from said preset holding means the preset information corresponding to the retrieved preset code, before setting the retrieved preset information to said signal correspondence holding means as said correspondence with regard to said remote controller.

16. A remote controller comprising:

signal receiving means for receiving as a trial signal an output signal given when a trial button of a trial-targeted remote controller is pushed;

preset holding means for holding, for each of a plurality of preset codes of a plurality of remote controllers, preset information representative of correspondences between buttons of a respective one of the plurality of remote controllers including said trial-targeted remote controller, and output signals given when said buttons are pushed;

evaluation value creating means for counting a largest number of preset codes of which said output signal is the same for each of the buttons shared between the plurality of remote controllers, before setting the largest count of the respective shared button as an evaluation value of the respective shared button;

evaluation value table storing means for storing the evaluation values for each of the buttons shared between the plurality of remote controllers;

button presenting means for presenting as said trial button to be pressed on the trial-targeted remote controller, when the evaluation value table storing means stores at least two different evaluation values, the shared button of which said evaluation value is the smallest based on the evaluation values stored in the evaluation value table storing means;

preset code determining means for retrieving the preset code having the correspondence between said trial button and said trial signal from said preset information held in said preset holding means;

signal correspondence retrieving means for retrieving said preset information corresponding to the retrieved preset code from said preset holding means;

a signal correspondence holder configured to hold said preset information retrieved by said signal correspondence retrieving means;

operation receiving means having at least one button and for receiving a button pushing operation;

a signal converter configured to retrieve the output signal corresponding to said button pushing operation from said preset information held in said signal correspondence holder; and signal outputting means for outputting said output signal retrieved by said signal converter.

* * * * *